US 6,550,555 B2

(12) United States Patent
Huber et al.

(10) Patent No.: US 6,550,555 B2
(45) Date of Patent: Apr. 22, 2003

(54) DRILL BIT FOR DRILLING ROCK

(75) Inventors: Ronald Huber, Vils (AT); Franz Krenn, Eugendorf (AT)

(73) Assignees: Alpen-May-Kestag GmbH, Salzburg (AT); Ceratizit Austria Aktiengesellschaft, Reutte/Tirol (AT)

( * ) Notice: Subject to any disclaimer, the term of this patent is extended or adjusted under 35 U.S.C. 154(b) by 4 days.

(21) Appl. No.: 09/783,186

(22) Filed: Feb. 14, 2001

(65) Prior Publication Data

US 2001/0013431 A1 Aug. 16, 2001

(30) Foreign Application Priority Data

Feb. 14, 2000 (AT) ............................ 97/2000 U

(51) Int. Cl.$^7$ .............................................. B23B 51/02
(52) U.S. Cl. ...................................... 175/415; 175/394
(58) Field of Search ............................. 175/394, 395, 175/401, 415, 420.1, 428, 430, 435

(56) References Cited

U.S. PATENT DOCUMENTS

| 2,635,856 A | * | 4/1953 | Scheffer ...................... 175/394 |
| 6,021,857 A | * | 2/2000 | Birk et al. .................. 175/415 |
| 6,102,634 A | * | 8/2000 | Turner et al. ............... 175/389 |

FOREIGN PATENT DOCUMENTS

| DE | 19734094 A1 | | 5/1998 |
| EP | 0761927 A1 | | 3/1997 |
| WO | WO 00/25967 | * | 5/2000 |

* cited by examiner

Primary Examiner—Thomas B. Will
Assistant Examiner—Meredith C. Petravick
(74) Attorney, Agent, or Firm—Laurence A. Greenberg; Werner H. Stemer; Ralph E. Locher

(57) ABSTRACT

A drill bit for drilling rock has an elongated shaft and at least one cutting plate at one end. A clearance angle $\beta$ of the cutting edges, at least in segments, increases with increasing distance from the rotary axis. A wedge angle $\gamma$ of the cutting edges, at least in segments, decreases with increasing distance from the rotary axis.

7 Claims, 2 Drawing Sheets

DRILL BIT FOR DRILLING ROCK

BACKGROUND OF THE INVENTION

Field of the Invention

The invention relates to a drill bit for drilling rock, having an elongated shank and at least one cutting plate at one end, the cutting plate having at least one end cutting edge running from the periphery to the rotary axis of the drill. The cutting edge is formed with the formation of a wedge angle $\gamma$ of an adjoining flank and rake face, the flank enclosing a clearance angle $\beta$ and the rake face enclosing a rake angle $\alpha$ with a plane E perpendicular to the rotary axis D, and the wedge angle $\gamma=180°-(\alpha+\beta)$ Drills for drilling rock generally consist of a cylindrical steel shaft formed with helically twisted flutes for the disposal of the drillings, a chucking part or shank end for attachment in the drill, and a drill bit head at the other end. The drill bit head is formed by one or more cutting plates connected to the steel shaft, as a rule by brazing, and made of a wear-resistant material such as hardmetal.

Such drill bits are required to have as high a drilling capacity (drilling progress per unit of time) as possible, on the one hand, and as long a tool life as possible, on the other hand.

The end of the tool life of the drill bit is generally determined by the maximum permissible width of the wear mark along the cutting edge at the rake faces and flanks of the end cutting edges. The maximum permissible width of the wear mark is about $\frac{2}{3}$ of the thickness of the cutting plate.

The wear mark results from roughening of the rake faces and flanks on account of friction with the removed material particles. In addition, high temperatures occur in the cutting-edge region due to the friction and lead to a diffusion of the metal particles from the cutting-edge region into the removed material particles. As a result, the cutting edge is weakened and, if the maximum permissible width of the wear mark is exceeded, failure of the cutting plate rapidly occurs.

In addition, if the maximum permissible width of the wear mark is exceeded and if the inadmissible dulling of the cutting edge associated therewith occurs, the material is only removed to a greatly reduced extent. The energy introduced by the drilling tool is increasingly converted into heat by the increased friction, so that the drill bit may heat up to the temperature at which the brazing filler metal with which the cutting plate is soldered in place melts. A loss of brazing of the cutting plate and thus failure of the drill bit is the result.

Since the cutting speeds in the peripheral region of the drill bit are markedly higher than in the center region, in particular the cutting-edge regions at the periphery of the cutting plate are subjected to increased wear.

The most widespread conventional drills for drilling rock have, as drill bit head, a cutting plate having two end cutting edges which adjoin one another in a roof shape and in each case have a constant clearance angle $\beta$ and wedge angle $\gamma$ along their profile from the periphery to the center of the drill bit.

In this case, the clearance angle $\beta$ is normally within a range of between 20° and 30°, whereas the rake angle is in the order of magnitude of about 60°, so that a constant wedge angle of between 90° and 100° is obtained.

In these conventional drills having constant clearance angles and wedge angles over the length of the end cutting edges, the end of the tool life is determined by the maximum permissible width of the wear mark at the peripheral region of the cutting plate. The maximum permissible width of the wear mark, on account of the higher cutting speed in this region, is reached much earlier than in the center region. The latter, of course, could actually continue to be used.

German Utility Model DE 298 19 388 U1 describes a hard metal cutting plate for use on a rock drill bit, in which cutting plate the clearance angle of the end cutting edge decreases with increasing distance from the rotary axis of the drill bit. Due to that construction, the support of the cutting edge, in particular at the peripheral region of the drill bit, is certainly improved and thus the risk of fracture of the cutting plate is reduced.

On account of the large wedge angle, however, the maximum permissible width of the wear mark is reached relatively quickly and the drilling capacity which can be achieved is not very high.

SUMMARY OF THE INVENTION

The object of the present invention is to provide a drill bit for drilling rock which overcomes the above-noted deficiencies and disadvantages of the prior art devices and methods of this general kind, and which has a high drilling capacity and in which the period until the maximum permissible width of the wear mark is reached, in particular at the peripheral regions of the end cutting edges, is increased.

With the above and other objects in view there is provided, in accordance with the invention, a drill bit for drilling rock, comprising:

an elongated shaft having a forward end and defining a rotary axis of the drill bit;

at least one cutting plate disposed at the forward end of the elongated shaft, the cutting plate being formed with a rake face and a flank enclosing a wedge angle $\gamma$ therebetween and defining a cutting edge extending from a periphery to the rotary axis of the drill bit;

the flank enclosing a clearance angle $\beta$ with a plane extending perpendicular to the rotary axis and the rake face enclosing a rake angle $\alpha$ with the plane;

wherein $\alpha+\beta+\gamma=180°$, and the clearance angle $\beta$ increases, at least in segments thereof, with an increasing distance from the rotary axis, and the wedge angle $\gamma$ decreases, at least in segments thereof, with an increasing distance from the rotary axis.

In other words, the objects of the invention are satisfied in that the clearance angle $\beta$ of the cutting edge, at least in sections, increases with increasing distance from the rotary axis D and the wedge angle $\gamma$, at least in sections, decreases with increasing distance from the rotary axis D.

This achieves the effect that good support of the drill bit point is achieved by a large wedge angle $\gamma$ in the region of the rotary axis D of the drill, whereas the smaller wedge angle $\gamma$ in the region of the drill bit periphery ensures that the maximum permissible width of the wear mark, compared with prior art drills having a constant clearance angle $\beta$ and wedge angle $\gamma$, is not reached until later, so that the wear in the center and in the peripheral region is made more uniform and thus the tool life is increased.

In accordance with an added feature of the invention, the clearance angle $\beta$ increases continuously and the wedge angle $\gamma$ decreases continuously. In this way, the cutting edge is subjected to uniform stress. No load peaks occur, which could cause premature failure of the cutting edge by fracture.

In accordance with an additional feature of the invention, the clearance angle $\beta$ increases from approximately 30° at the rotary axis D to approximately 40° at the periphery of the drill bit, and the wedge angle γ decreases from approximately 90° at the rotary axis to approximately 50° at the periphery of the drill bit.

In accordance with another feature of the invention, the cutting plate is a single cutting plate formed with two straight cutting edges enclosing a point angle δ of about 130° with one another.

The configuration according to the invention is used especially frequently and advantageously in drills which are provided with a single cutting plate with two straight end cutting edges that enclose the point angle δ of about 130°.

In practice, it has proved to be especially advantageous for a uniform high cutting capacity to provide a clearance angle β of about 30° and a wedge angle γ of about 90° in the region of the rotary axis D, and to provide a clearance angle β of about 40° and a wedge angle γ of about 50° in the peripheral region of the drill.

In accordance with a concomitant feature of the invention, each of the cutting edges is formed in two parts including a straight center segment and a straight peripheral segment, the peripheral segment jutting out above the center segment in a forward drilling direction and extending at an inclination substantially identical to an inclination of the center segment.

This is an especially advantageous variant of the drill bit according to the invention. It achieves the effect that that region of the cutting edge which is subjected to the greatest stress in terms of wear is deliberately strengthened by additional material build-up.

With the above and other objects in view there is also provided, in accordance with the invention, a drill bit cutting plate for rock drill bits which has the characteristics outlined above, namely:

a cutting edge with a wedge angle γ defined by a rake face and a flank; the flank enclosing a clearance angle β with a plane extending orthogonally to an intended axis of rotation of the cutting plate and the rake face enclosing a rake angle α with the plane; wherein the angles α+β+γ are complementary to sum to 180°, and the clearance angle β increases, at least in segments thereof, with an increasing distance from the rotary center, and the wedge angle γ decreases, at least in segments thereof, with an increasing distance from the rotary center.

Other features which are considered as characteristic for the invention are set forth in the appended claims.

Although the invention is illustrated and described herein as embodied in a drill bit for drilling rock, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
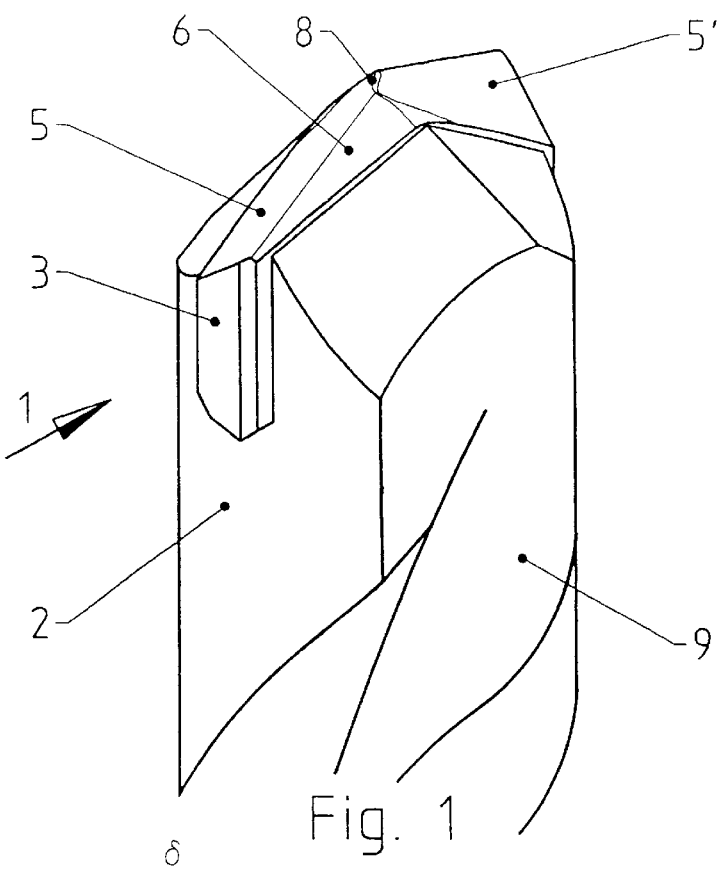
FIG. 1 is a perspective view of a drill bit head of a drill bit according to the invention.
Figure 2:
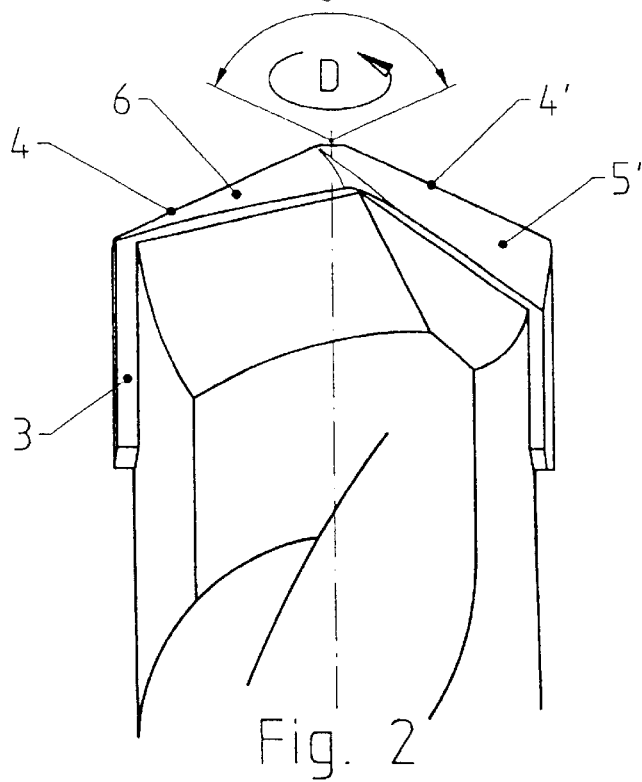
FIG. 2 is a front elevation of the drill bit head of FIG. 1, in an alignment parallel to the main cutting edges.
Figure 3:
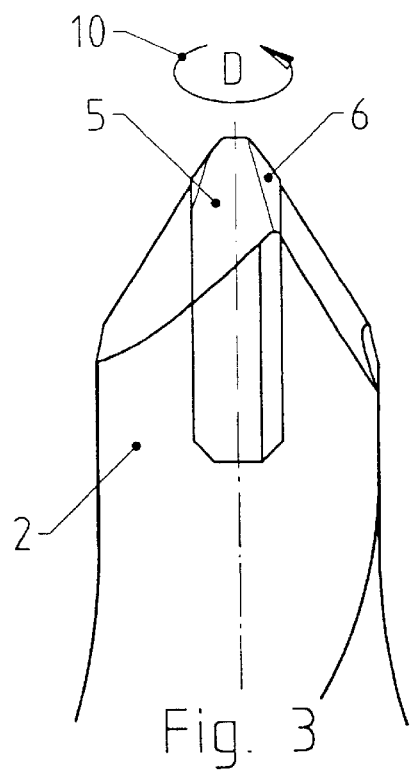
FIG. 3 is a side elevation of the drill bit head of FIG. 1, in an alignment perpendicular to the main cutting edges.
Figure 4:
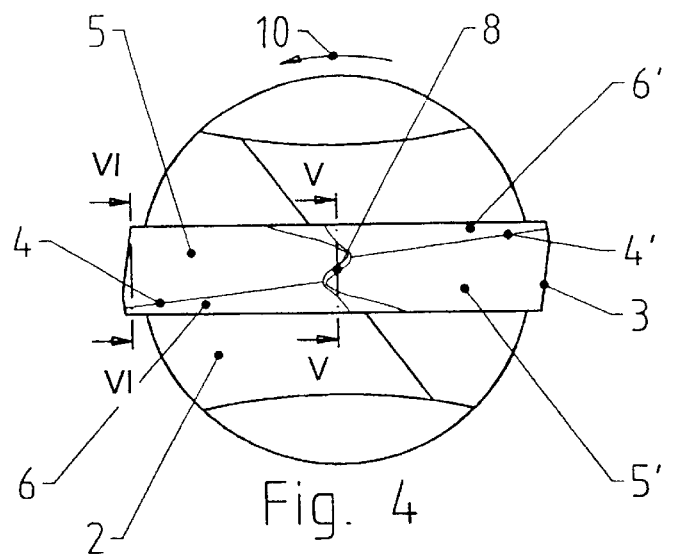
FIG. 4 is a plan view of the drill bit head according to the invention.
Figures 5, 6:
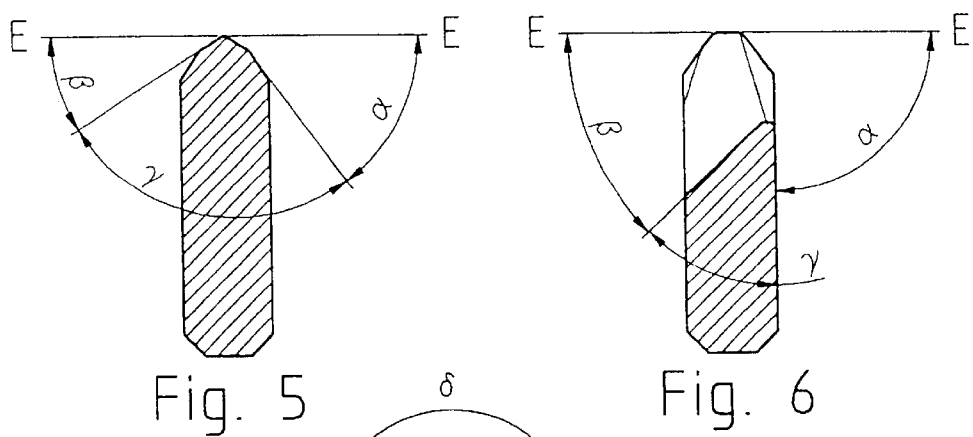
FIG. 5 is a section taken through the cutting plate along the section line V—V in FIG. 4.
FIG. 6 is a section taken through the cutting plate along the line VI—VI in FIG. 4.

Referring now to the figures of the drawing in detail and first, particularly, to the various views in FIGS. 1–6 thereof, the drill bit 1 according to the invention for drilling rock has an elongated shaft 2 (only partly shown) with helically rifled flutes 9 for the disposal of the drillings. The direction of rotation of the drill bit about the rotary axis D is indicated by an arrow 10. To form the drill bit head, the end of the shaft 2 is provided with a slot transversely to the rotary axis D of the drill bit 1. A hard metal cutting plate 3 is brazed in place in the slot and slightly projects at the periphery. The cutting plate 3 has two end cutting edges 4, 4', which adjoin one another in a roof shape and enclose a point angle δ of 130° with one another. The cutting edges 4, 4' are in each case formed with the formation of a wedge angle γ of an adjoining flank 5, 5' and rake face 6, 6', which enclose a clearance angle β and a rake angle α with a plane E that is orthogonal to the rotary axis D.

The wedge angle γ complements the rake angle α and the clearance angle β to make 180°. According to the invention, at each cutting edge 4, 4', the clearance angle β increases continuously with increasing distance from the rotary axis D, whereas the wedge angle γ decreases continuously with increasing distance from the rotary axis D. As a result, a spiral profile of the flanks 5, 5' is obtained. The result of this is that the rake angle α changes along the cutting edge 4, 4' from about 60° in the center of the drill bit to about 90° at the periphery of the drill bit. The clearance angle β is about 30° in the center of the drill bit and about 40° at the periphery of the cutting plate 3. This is shown in an enlarged view by the section V—V in FIG. 5 and the section VI—VI in FIG. 6. It has proved to be expedient in the case of rock drills not to have the cutting edges 4, 4' running directly into one another in the center of the drill bit but to eccentrically offset these cutting edges 4, 4' slightly and to connect them to one another via a chisel edge 8.

Since the cutting speed in the center of the drill bit is 0, optimum material removal is normally no longer effected by the rotary movement of the drill. Due to the formation of a chisel edge, a chiseling effect is achieved in combination with the percussion movement of the drill, and this chiseling effect also ensures good material removal in the critical center region. However, for good drilling progress, this chisel edge 8 should not be too large. As can be seen in the plan view of the drill bit according to the invention in FIG. 4, the rake faces 6, 6' increase in their width from the periphery of the drill bit toward the center, so that a short chisel edge 8 is obtained.

Figure 7:
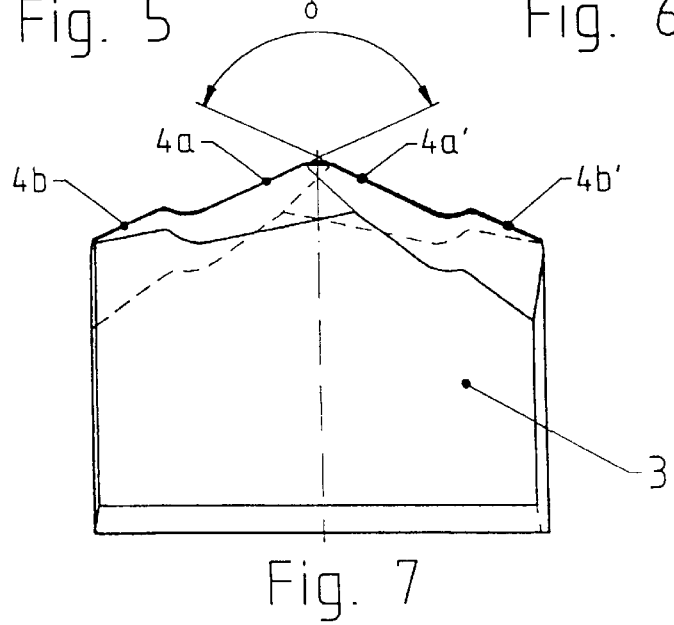
FIG. 7 is a side view of a variation of a cutting plate for a drill bit according to the invention and viewed in a direction perpendicular to the main cutting edges.

Referring now to FIG. 7, there is shown a variant of the cutting plate for a drill bit according to the invention.

The end cutting edges 4, 4' of the cutting plate 3 are designed in two parts, specifically comprising straight center segments 4a, 4a', which enclose a point angle δ of 130° with one another, and straight peripheral segments 4b, 4b'. The peripheral segments 4b, 4b' jut out above the center segments 4a, 4a' in the drilling feed direction and have the same inclination as the center segments 4a, 4a'.

The regions of the cutting edge at the drill bit periphery which are subjected to especially pronounced wear are additionally strengthened by such a construction.

We claim:

1. A drill bit for drilling rock, comprising:

an elongated shaft having a forward end and defining a rotary axis of the drill bit;

at least one cutting plate disposed at said forward end of said elongated shaft, said cutting plate being formed with a rake face and a flank enclosing a wedge angle $\gamma$ therebetween and defining a cutting edge extending from a periphery to said rotary axis of the drill bit;

said flank enclosing a clearance angle $\beta$ with a plane extending perpendicular to said rotary axis and said rake face enclosing a rake angle $\alpha$ with the plane;

wherein $\alpha+\beta+\gamma=180°$, and said flank has segments wherein said clearance angle $\beta$ increases continuously with an increasing distance from said rotary axis, and said wedge angle $\gamma$ decreases continuously with an increasing distance from said rotary axis.

2. The drill bit according to claim 1, wherein said clearance angle $\beta$ increases from approximately 30° at said rotary axis D to approximately 40° at the periphery of the drill bit, and said wedge angle $\gamma$ decreases from approximately 90° at said rotary axis to approximately 50° at the periphery of the drill bit.

3. The drill bit according to claim 1, wherein said cutting plate is a single cutting plate formed with two straight cutting edges enclosing a point angle $\delta$ of about 130° with one another.

4. The drill bit according to claim 3, wherein each of said cutting edges is formed in two parts including a straight center segment and a straight peripheral segment, said peripheral segment jutting out above said center segment in a forward drilling direction and extending at an inclination substantially identical to an inclination of said center segment.

5. A drill bit cutting plate for a drill bit having a rotary axis, the cutting plate comprising:

a rake face and a flank enclosing a wedge angle $\gamma$ therebetween and defining a cutting edge extending along an intersection between said rake face and said flank from a periphery to a rotary center of the cutting plate;

said flank enclosing a clearance angle $\beta$ with a plane extending orthogonally to an intended axis of rotation of the cutting plate and said rake face enclosing a rake angle $\alpha$ with the plane;

wherein $\alpha+\beta+\gamma=180°$, and said flank has segments wherein said clearance angle $\beta$ increases continuously with an increasing distance from the rotary center, and said wedge angle $\gamma$ decreases continuously with an increasing distance from said rotary center.

6. A drill bit for drilling rock, comprising:

an elongated shaft having a forward end and defining a rotary axis of the drill bit;

at least one cutting plate disposed at said forward end of said elongated shaft, said cutting plate being formed with a rake face and a flank enclosing a wedge angle $\gamma$ therebetween and defining a cutting edge extending from a periphery to said rotary axis of the drill bit;

said flank enclosing a clearance angle $\beta$ with a plane extending perpendicular to said rotary axis and said rake face enclosing a rake angle $\alpha$ with the plane;

wherein $\alpha+\beta+\gamma=180°$, and said clearance angle $\beta$ increases continuously with an increasing distance from said rotary axis, and said wedge angle $\gamma$ decreases continuously with an increasing distance from said rotary axis.

7. A drill bit cutting plate for a drill bit having a rotary axis, the cutting plate comprising:

a rake face and a flank enclosing a wedge angle $\gamma$ therebetween and defining a cutting edge extending along an intersection between said rake face and said flank from a periphery to a rotary center of the cutting plate;

said flank enclosing a clearance angle $\beta$ with a plane extending orthogonally to an intended axis of rotation of the cutting plate and said rake face enclosing a rake angle $\alpha$ with the plane;

wherein $\alpha+\beta+\gamma=180°$, and said clearance angle $\beta$ increases continuously with an increasing distance from the rotary center, and said wedge angle $\gamma$ decreases continuously with an increasing distance from said rotary center.

* * * * *